US010430928B2

United States Patent
Pearse et al.

(10) Patent No.: US 10,430,928 B2
(45) Date of Patent: Oct. 1, 2019

(54) ITERATED GEOMETRIC HARMONICS FOR DATA IMPUTATION AND RECONSTRUCTION OF MISSING DATA

(71) Applicant: Cal Poly Corporation, San Luis Obispo, CA (US)

(72) Inventors: Erin P. J. Pearse, San Luis Obispo, CA (US); Jonathan A. Lindgren, San Luis Obispo, CA (US); Chad Eckman, San Luis Obispo, CA (US); Zachariah Zhang, San Luis Obispo, CA (US); David J. Sacco, Stillwater, OK (US)

(73) Assignee: Cal Poly Corporation, San Luis Obispo, CA (US)

( * ) Notice: Subject to any disclaimer, the term of this patent is extended or adjusted under 35 U.S.C. 154(b) by 917 days.

(21) Appl. No.: 14/920,556

(22) Filed: Oct. 22, 2015

(65) Prior Publication Data

US 2016/0117605 A1     Apr. 28, 2016

Related U.S. Application Data

(60) Provisional application No. 62/067,555, filed on Oct. 23, 2014.

(51) Int. Cl.
    *G06N 5/02*     (2006.01)
    *G06T 5/00*     (2006.01)
    *G06F 17/17*     (2006.01)

(52) U.S. Cl.
    CPC ............ *G06T 5/005* (2013.01); *G06F 17/175* (2013.01); *G06T 2207/20076* (2013.01); *G06T 2207/30201* (2013.01)

(58) Field of Classification Search
    CPC .......... G06T 5/005; G06T 2207/20076; G06T 2207/30201; G06F 17/175; G06F 17/16; G06N 99/005

(Continued)

(56) References Cited

U.S. PATENT DOCUMENTS

| | | | |
|---|---|---|---|
| 2005/0071300 A1* | 3/2005 | Bartlett | G06K 9/6215 706/12 |
| 2005/0228591 A1* | 10/2005 | Hur | G06K 9/6215 702/19 |

(Continued)

OTHER PUBLICATIONS

Eckman et al., "Iterated Geometric Harmonics for Data Imputation and Reconstruction of Missing Data", Nov. 4, 2014. (Year: 2014).*

(Continued)

*Primary Examiner* — Dave Misir
(74) *Attorney, Agent, or Firm* — SoCal IP Law Group LLP; Mark A. Goldstein

(57) ABSTRACT

Systems and methods for reconstruction of missing data using iterated geometric harmonics are described herein. A method includes receiving a dataset having missing entries, initializing missing values in the dataset with random data, and then performing the following actions for multiple iterations. The iterated actions include selecting a column to be updated, removing the selected column from the dataset, converting the dataset into a Gram matrix using a kernel function, extracting rows from the Gram matrix for which the selected column does not contain temporary values to form a reduced Gram matrix, diagonalizing the reduced Gram matrix to find eigenvalues and eigenvectors, constructing geometric harmonics using the eigenvectors to fill in missing values in the dataset, and filling in missing values to improve the dataset and create a reconstructed dataset. The result is a reconstructed dataset. The method is particularly useful in reconstructing image and video files.

14 Claims, 6 Drawing Sheets

Original 610     Damaged 620     Reconstructed 630

© 2015 Cal Poly Corporation

(58) Field of Classification Search
USPC .......................................................... 706/12
See application file for complete search history.

(56) References Cited

U.S. PATENT DOCUMENTS

| | | | | |
|---|---|---|---|---|
| 2010/0274753 | A1* | 10/2010 | Liberty | G06F 17/3064 706/50 |
| 2013/0223753 | A1* | 8/2013 | Sornborger | G06K 9/00496 382/254 |

OTHER PUBLICATIONS

N. Aronszajn, Theory of Reproducing Kernels, Transactions of the American Mathematical Society, vol. 68, No. 3, (May 1950), pp. 337-404, Not supplied (blank doc.), but retrieved online.

Belkin et al., Laplacian Eigenmaps for Dimensionality Reduction and Data Representation, Neural Computation vol. 15 Issue 6, Jun. 2003, pp. 1373-1396.

Belkin et al., Manifold Regularization: A Geometric Framework for Learning from Labeled and Unlabeled Examples, The Journal of Machine Learning Research archive, vol. 7, Dec. 1, 2006, pp. 2399-2434.

Bengio et al., Out-of-Sample Extensions for LLE, Isomap, MDS, Eigenmaps, and Spectral Clustering, Advances in Neural Information Processing Systems 16 in 2003.

Coifman et al., Diffusion Maps, Reduction Coordinates and Low Dimensional Representation of Stochastic Systems, http://www.wisdom.weizmann.ac.il/~nadler/Publications/diffusion_map_MMS.pdf, last accessed Jan. 28, 2016, pp. 1-23.

Coifman et al., Diffusion maps, Science Direct, Applied and Computational Harmonic Analysis, vol. 21, Issue 1, Jul. 2006, http://www.sciencedirect.com/science/article/pii/S1063520306000546. pp. 5-30.

Coifman et al., Geometric harmonics: A novel tool for multiscale out-of-sample extension of empirical functions, Applied and Computational Harmonic Analysis, vol. 21, Issue 1, Jul. 2006, http://www.sciencedirect.com/science/article/pii/S1063520306000522, pp. 31-52.

Drineas et al., On the Nystrom Method for Approximating a Gram Matrix forImproved Kernel-Based Learning, Journal of Machine Learning Research 6 (Dec. 2005) 2153-2175.

Fowlkes et al., Efficient Spatiotemporal Grouping Using the Nystrom Method, http://www.ics.uci.edu/~fowlkes/papers/fbm-cvpr01.pdf, last accessed Jan. 28, 2016, pp. 1-8.

Fowlkes et al., Spectral Grouping Using the Nystrom Method, IEEE Transactions on Pattern Analysis and Machine Intelligence, vol. 26, No. 2, Feb. 2004.

Gittens et al., Revisiting the Nyström Method for Improved Large-Scale Machine Learning, Cornell University Library, http://arxiv.org/abs/1303.1849, Jun. 3, 2013.

Keller et al., Audio-Visual Group Recognition Using Diffusion Maps, IEEE Transactions on Signal Processing, vol. 58, No. 1, Jan. 2010.

Lafon et al., Diffusion Maps and Coarse-Graining: A Unified Framework for Dimensionality Reduction, Graph Partitioning, and Data Set Parameterization, IEEE Transactions on Pattern Analysis and Machine Intelligence, vol. 28, No. 9, Sep. 2006, pp. 1393-1403.

Lafon, Diffusion Maps and Geometric Harmonics, May 2004, pp. 1-97.

Landau et al., Prolate Spheroidal Wave Functions, Fourier Analysis and Uncertainty—II, Bell System Technical Journal, 40: 1. Jan. 1961 pp. 65-84.

Nadler et al., Diffusion Maps—a Probabilistic Interpretation for Spectral Embedding and Clustering Algorithms, Principal Manifolds for Data Visualization and Dimension Reduction, vol. 58 of the series Lecture Notes in Computational Science and Engine pp. 238-260.

Scholkopf et al., Nonlinear Component Analysis as a Kernel Eigenvalue Problem, Max-Planck-Institut Für biologische Kybernetik, Technical Report No. 44, Dec. 1996.

Slepian et al., Prolate Spheroidal Wave Functions, Fourier Analysis and Uncertainty—IV: Extensions to Many Dimensions; Generalized Prolate Spheroidal Functions, Bell System Technical Journal, 43: 6. Nov. 1964, pp. 3009-3057.

Slepian et al., Prolate Spheroidal Wave Functions, Fourier Analysis and Uncertainty—I, Bell System Technical Journal, 40:1. Jan. 1961 pp. 43-63.

Williams et al., Using the Nystrom Method to Speed Up Kernel Machines, In Advances in Neural Information Processing Systems 13 (2001), pp. 682-688.

* cited by examiner

ITERATED GEOMETRIC HARMONICS FOR DATA IMPUTATION AND RECONSTRUCTION OF MISSING DATA

RELATED APPLICATION INFORMATION

This patent claims priority from provisional patent application No. 62/067,555 filed Oct. 23, 2014, the contents of which are incorporated herein in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to image processing, and more specifically, to data reconstruction and imputation of missing data.

Description of the Related Art

The technique of geometric harmonics was introduced as a method of extending empirical functions defined on a dataset in the form of a point cloud.

The term "geometric harmonics" refers to an eigenbasis for an incomplete Gram matrix, constructed empirically by means of a variant of what is known by those skilled in the art as the Nystrom method. The Nystrom method is a quadrature rule that allows a solution to an integral equation to be approximated by subsampling in which the integral is replaced by a sum of function values, where the function is evaluated on sample points weighted according to the quadrature rule.

When data is missing for any of a various reasons, it is difficult to reconstruct. Discarding incomplete data is a poor choice, as it can easily bias the remaining data or leave the analyst with too little data for a proper analysis or rendering. The present state-of-the-art technique for dealing with missing data is known as multiple imputation, in which multiple complete versions of the data are simulated by filling in missing entries in a purely stochastic manner. The analyses of different simulated versions are then averaged or pooled. This essentially linear technique does not perform well when the data has a strongly nonlinear structure. In addition, other techniques for imputation of missing data require some portion of the dataset to be intact. The intact subset of the data is called a "training set". The method described herein is distinguishable in that it can be applied when no training set is available.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

The methods described herein allow for reconstruction of datasets which are incomplete due to missing values due to recording errors, transmission loss, storage medium integrity failures and the like. The method described herein is limited to working with datasets having missing data (for example, drop outs) and not with datasets having corrupted or altered data. Applications of the method include image processing, image reconstruction and video reconstruction, as video media naturally contains large numbers of similar images or frames.

System

Figure 1:
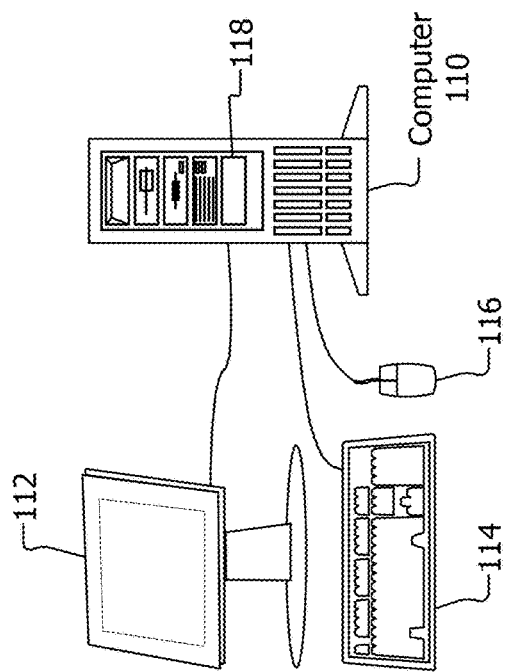
FIG. 1 is a block diagram of a personal computer system on which the methods described herein may be implemented and executed.

FIG. 1 is a block diagram of a personal computer 110 on which the methods described herein may be implemented and executed. The methods described herein are implemented in software and may be application software. The software may be written in a high level language and/or in a machine or assembler language. The software is stored on a machine readable storage media and executed on a computing device such as personal computer 110. Similarly, the data set described herein may be stored as one or multiple files on machine readable storage media accessible either directly or via a storage device included with or otherwise coupled with or attached to a computing device. The dataset may be stored on the same machine readable storage media or a different machine readable storage media from the storage media on which software that executes the methods described herein is stored.

A computing device as used herein refers to a device with memory, a storage device and/or storage media, and at least one processor that executes instructions including, but not limited to, personal computers, computer workstations, mini computers, server computers, computing tablets, portable computers, and laptop computers. These computing devices run an operating system such as, for example, the Unix, Linux, Microsoft Windows, and Apple Mac operating systems.

The machine readable storage media may be included in a storage device and is included with or coupled or attached to a computing device. That is, the software is stored on a machine readable storage media. Storage media include magnetic media such as hard disks; optical media such as compact disks (CD-ROM and CD-RW), digital versatile disks (DVD and DVD±RW) and BLU-RAY disks; silicon or chip-based storage media including flash memory cards, thumb drives, silicon storage devices; and other magnetic, optical or silicon-based storage media. As used herein, a storage device is a device that allows for reading and/or writing to a storage medium. Storage devices include hard disk drives (HDDs), silicon storage devices (SSDs), DVD drives, flash memory devices, and others.

Referring again to FIG. 1, personal computer 110 includes or is coupled with a display, such as display 112, one or more user input devices, including, for example, keyboard 114, mouse 116, a track ball, a scroll wheel, a touch pad, a key pad, a touch screen, navigation buttons, a joystick, a pen and tablet, a stylus, and/or others. A user uses a user input device to click on, select, or otherwise activate or control a user interface item such as a button, link, slider, etc. and to provide input to the operating system or programs running on the personal computer via a graphical user interface, text interface or other user interface provided on the computing device. Personal computer 110 includes at least one primary storage device such as hard disk drive 118 or other storage device. The personal computer 110 and other computing devices may include a network interface. Locally attached and/or remotely accessible storage media may be accessed over a network through the network interface, and the dataset described herein may be stored locally or accessed over a network through the network interface. The methods described herein may be implemented on a single computing device such as personal computer 110, or may be implemented on a group of computing devices arranged in a network, cluster, or other organization. The personal computer 110 and other computing devices may include other components known to those skilled in the art including, for example WiFi, Universal Serial Bus (USB) and others, which are not discussed herein.

Processes

Figure 2:
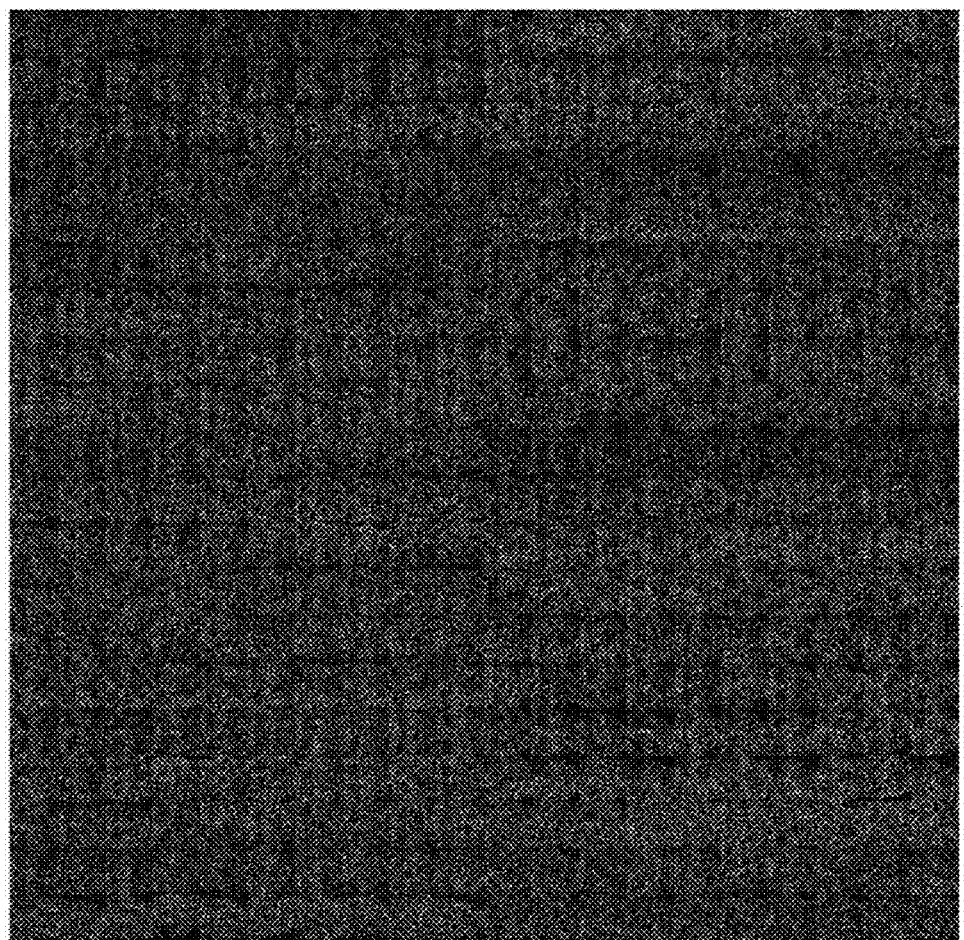
FIG. 2 is an image of the Olivetti faces dataset with missing data.
Figure 3:
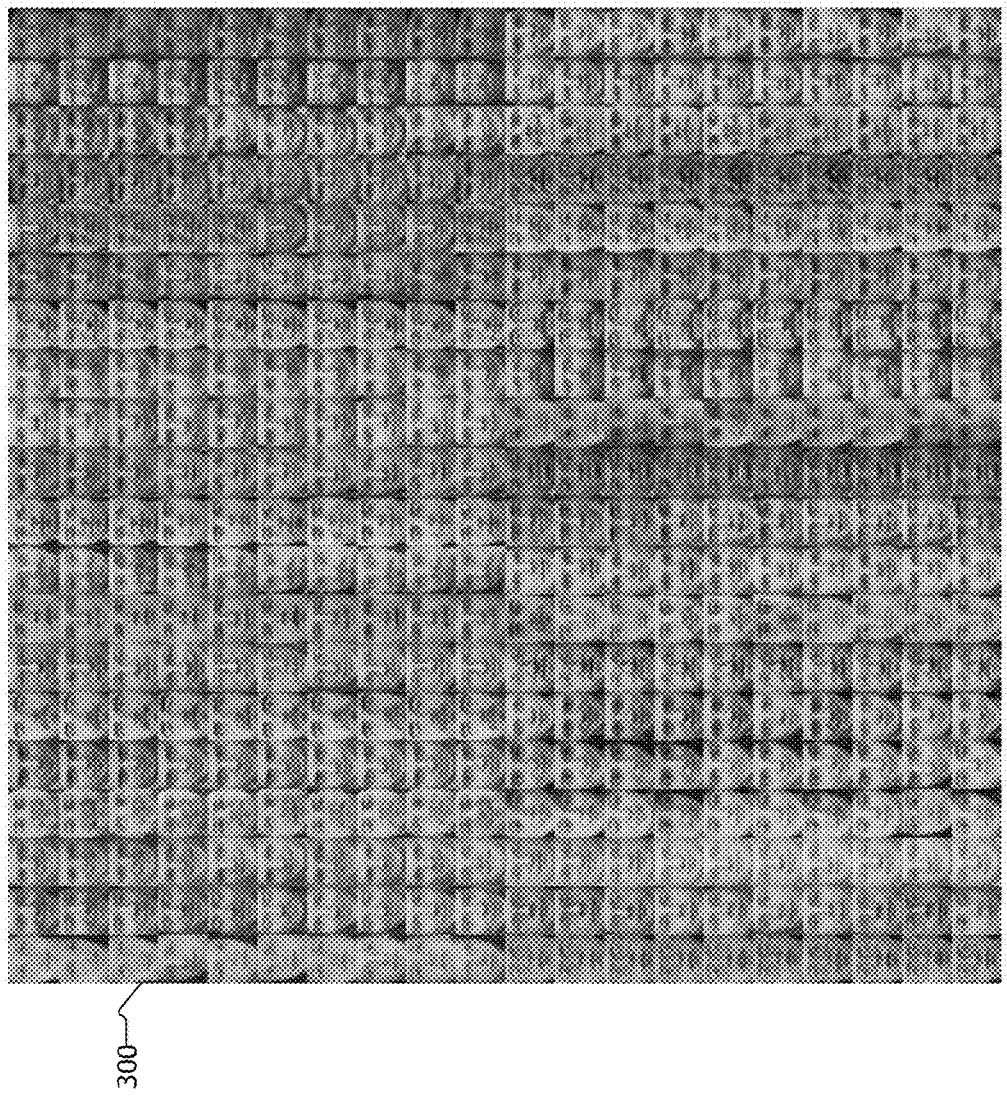
FIG. 3 is an image of the Olivetti faces dataset with missing data reconstructed according to the methods described herein.
Figure 4:
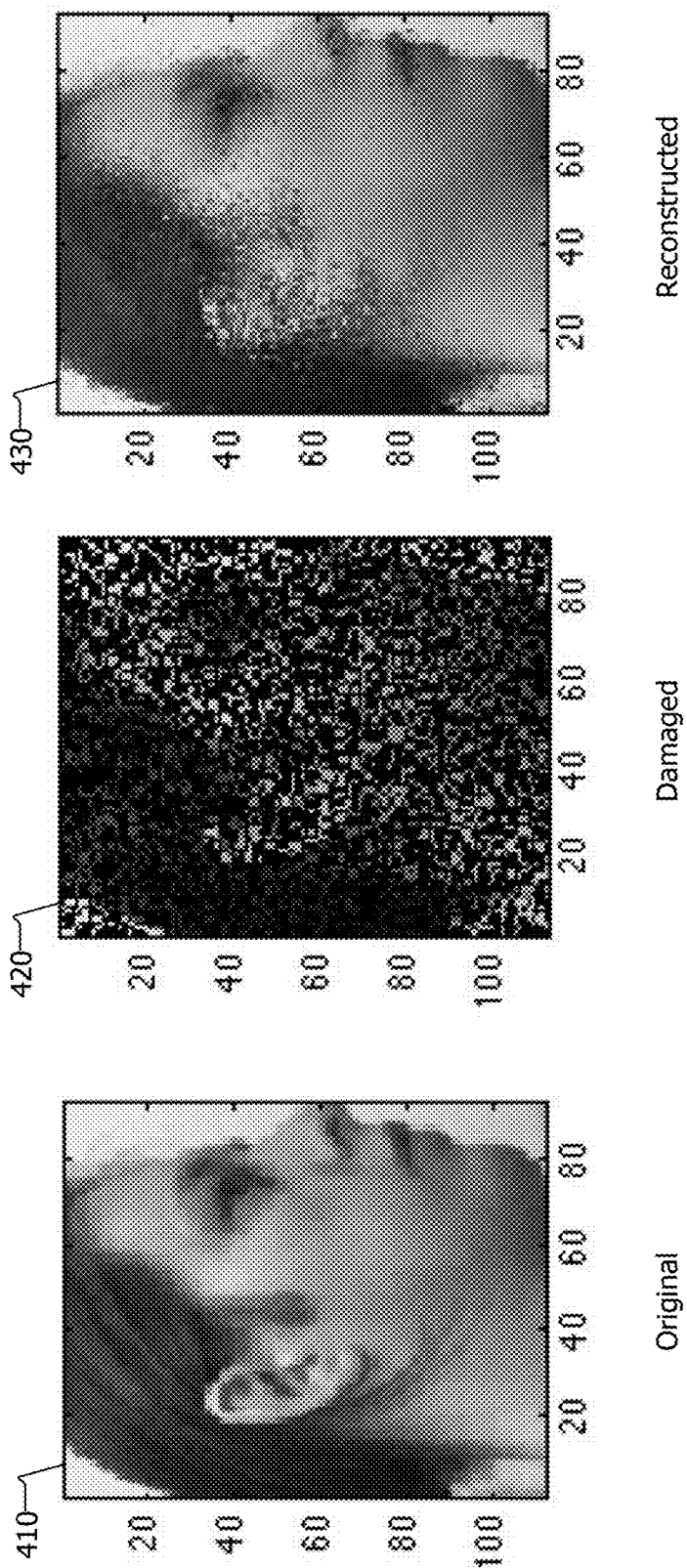
FIG. 4 shows images of original, damaged and reconstructed versions of a photograph.

The methods described herein can reconstruct data with a high level of accuracy, even when the portion of missing data reaches very high levels. FIGS. 2, 3 and 4 show examples in which 70% of the original data was lost. This far exceeds the capability of earlier methods, including those that require a training set of complete data. Referring to FIG. 2, an image (200) of the Olivetti faces dataset with missing data is shown. In this example, missing data values have been replaced with black pixels. The damage to the image is readily apparent upon viewing. The unusable images are made usable by reconstructing them according the methods described herein. FIG. 3 is an image (300) of the Olivetti faces dataset with missing data reconstructed according to the methods described herein. The improvement is readily apparent. Here, in this image set, 10 different images each of 40 people are depicted. Due to the recurring features in the images, the method iteratively analyzed and reconstructed missing data based on the data from other photos in the group.

FIG. 4 shows images of original (410), damaged (420) and reconstructed (430) versions of a photograph. Here, 30 images of this individual having size 112×92 pixels were included in a group. Due to the recurring features in the images, the method iteratively analyzed and reconstructed missing data based on the data from other photos in the group. The results are not perfect, but the reconstructed images that result from application of the method described herein are useful for human identification and evaluation purposes.

Figure 5:
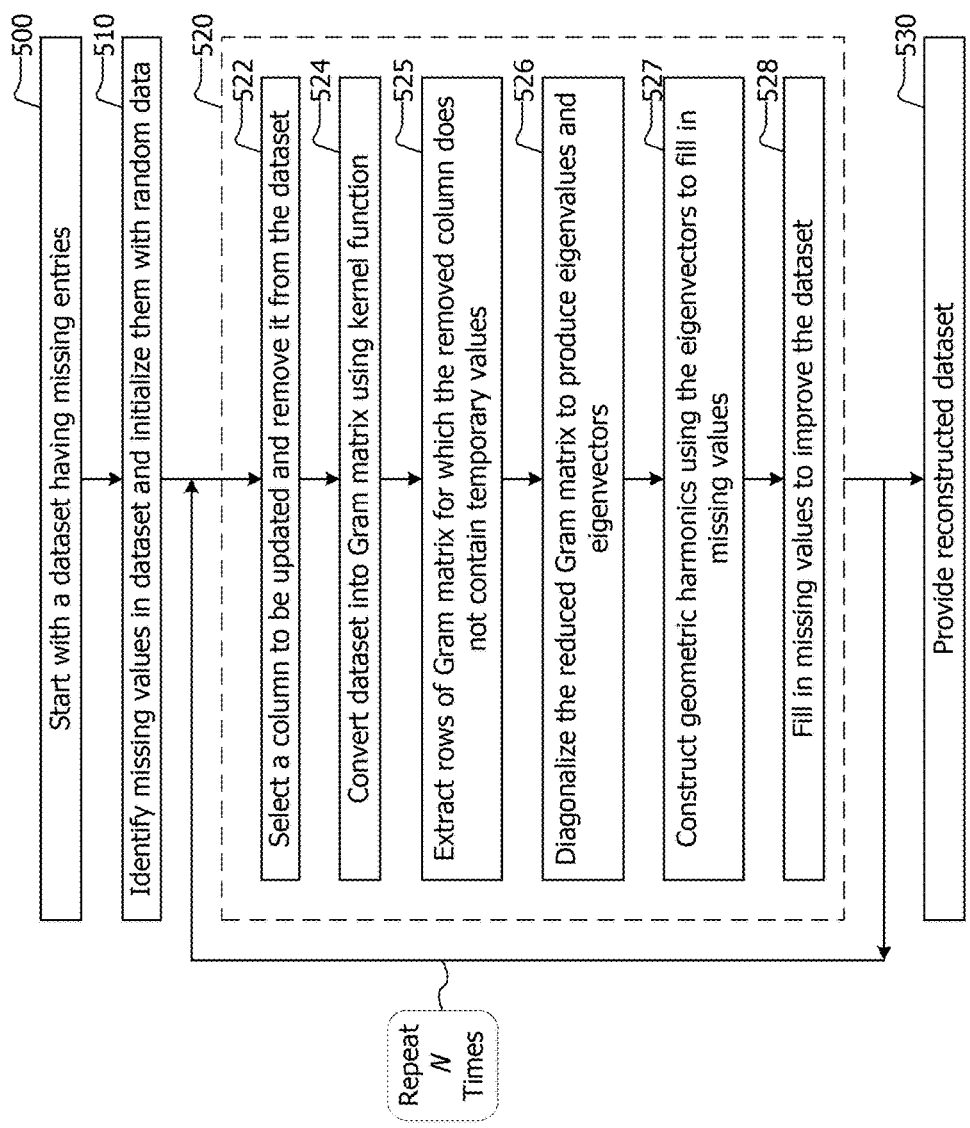
FIG. 5 is a flow chart of a method of reconstruction of missing data using iterated geometric harmonics.

Referring now to FIG. 5, a method of reconstructing missing data using iterated geometric harmonics is provided in a flow chart. The method starts with a dataset having missing entries, as shown in block 500. A dataset X may be a group of imperfect or damaged image files having missing data, such as JPG or PNG format files, and the dataset may be data representing one or more frames from a video. The dataset is in the form of a matrix. In one embodiment, missing values in the dataset are identified and initialized with random data, as shown in block 510. In other embodiments, missing data may be replaced with a flag or identifiable value or may be a value representing a particular color such as black, red or yellow.

The iterative nature of the method is achieved by repeating the actions in block 520 multiple or N times. In some versions of the method repeating the actions in block 520 multiple times allows for reconstruction or imputation of the missing data based on surrounding related or other similar data. This is a form of interpolation or extrapolation, depending on the implementation. The iterations may be repeated several times (in one implementation, four to six times) dependent on the number of items in the recurring data in the dataset, the size of the dataset and the amount of missing data. As such, other numbers of iterations may be effective in other implementations dependent on the characteristics of the particular dataset.

A column with missing data to be updated is selected and removed from the dataset, as shown in block 522. In practice, new matrix $X^{(j)}$ is formed by deleting column j from X.

The dataset is converted into a Gram matrix using a kernel function, as shown in block 524. In practice, a (restricted) Gram matrix $K^{(j)}$ is computed by applying the following equation to the rows of $X^{(j)}$. For a dataset with n records, the method requires computing an n×n Gram matrix K with entries in which $$K(i,j)=k(x_i,x_j),$$

where $$k: \mathbb{R}^d \times \mathbb{R}^d \to \mathbb{R}_+$$

is a symmetric, nonnegative, and typically positive semi-definite function.

Rows of the Gram matrix for which the removed column does not contain temporary values are extracted, as shown in block 525. In practice, a set of rows of the dataset X for which $\lambda_j$ is defined is created as $A_j$. That is, the set $A_j$ includes those rows of X for which $x_{ij}$ is not a missing value.

The reduced Gram matrix is diagonalized to produce eigenvalues and eigenvectors, as shown in block 526. That is, the eigendata of $K^{(j)*}K^{(j)}$ is computed. This may be achieved by evaluating $$\lambda_l^{(j)} \in \mathbb{R} \text{ and } \psi_l^{(j)} \in \mathbb{R}^{|A_j|}$$

that satisfy the following equation for $l=1, \ldots, |A_j|$:

$$\sum_{m \in A_j} K(i,m)\psi_l^{(j)}(m) = \lambda_l^{(j)}\psi_l^{(j)}(i).$$

The geometric harmonics are constructed using the eigenvectors to fill in missing values, as shown in block 527. The geometric harmonics are constructed according to the following equation:

$$\Psi_l^{(j)}(i) := \frac{1}{\lambda_l^{(j)}} \sum_{m \in A_j} K(i,m)\psi_l^{(j)}(m).$$

Missing data is filled in to improve the dataset, as shown in block 528. This is achieved according to the equation:

$$\hat{\gamma}_j(i) = \sum_{l=1}^{|A_j|} \langle \gamma_j, \psi_l^{(j)} \rangle A_j \Psi_l^{(j)}(i).$$

The actions in blocks 522, 524, 525, 526, 527 and 528 are repeated multiple or N times. In one implementation the iteration is four to six times. Additional or fewer iterations may be required based on factors including desired amount of reconstruction, time available to reconstruct, the condition of the original data set, namely the amount of missing data.

Figure 6:
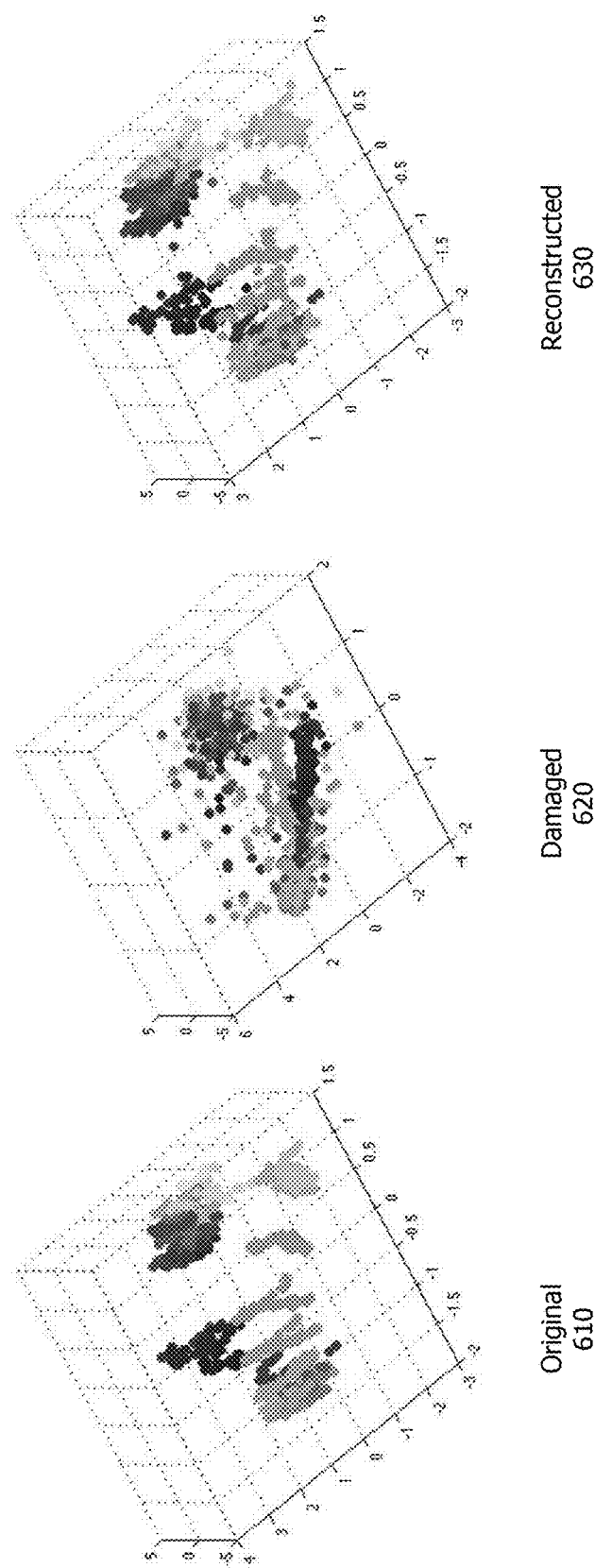
FIG. 6 are graphs of original, damaged and reconstructed versions of a dataset consisting of weather data.

Although the methods are described herein are applicable to images and series of images such as frames of video, the method is applicable to other kinds of datasets. For example the method has been applied to weather data having missing values. FIG. 6 are graphs of original (610), damaged (620) and reconstructed (630) versions of a dataset consisting of weather data. The ability of the method to improve the dataset with damaged (that is, missing) data is readily apparent upon viewing the graphs shown in FIG. 6. These graphs are of a 25-dimensional dataset embedded into three dimensions using t-SNE (t-distributed Stochastic Neighborhood Embedding), an iterative stochastic method that constructs a visual representation of data. Here, in this example, the weather dataset included 2000 records containing 25 parameters, including average and quantile measurements of temperature, pressure, dew point, wind velocity, and cloud cover recorded hourly.

The method is applicable to any high-dimensional dataset (for example, 5 to 50,000 characteristics per data record) with the data having continuity properties that is, for example, where if 95% of the entries of x and y are very close, it is very likely the other or remaining entries of x and y are also very close. The method is particularly well-suited to dealing with datasets which have very high dimension, and relatively few records. For example, 10 seconds of video might have 240 frames (where the frames are considered data records), each with over 10 million pixel values (such that dimension d>10,000,000). The method improves dramatically when there is redundancy in the dataset, that is, when there are many similar records in the dataset. In addition to weather data, any other large sets of data with recurring related features or characteristics may be evaluated and reconstructed according to the method described herein.

Closing Comments

Throughout this description, the embodiments and examples shown should be considered as exemplars, rather than limitations on the apparatus and procedures disclosed or claimed. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, that is, to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for reconstructing missing data comprising:
   receiving a dataset having missing entries;
   initializing missing values in the dataset with random data;
   performing the following actions for multiple iterations:
     selecting a column to be updated and removing the selected column from the dataset,
     converting the dataset into a Gram matrix using a kernel function,
     extracting rows from the Gram matrix for which the selected column does not contain temporary values to form a reduced Gram matrix,
     diagonalizing the reduced Gram matrix to find eigendata including eigenvalues and eigenvectors,
     constructing geometric harmonics using the eigenvectors to fill in the missing values in the dataset,
     filling in the missing values to improve the dataset and create a reconstructed dataset;
   providing the reconstructed dataset.

2. The method of claim 1 wherein the converting is performed using $K(i, j)=k(x_i, x_j)$ where $K(i, j)$ is the Gram matrix and $k(x_i, x_j)$ is the kernel function.

3. The method of claim 1 wherein the diagonalizing is achieved by computing the eigendata of $K^{(j)*}K^{(j)}$ where $K^{(j)}$ is a restricted Gram matrix.

4. The method of claim 3 wherein the computing the eigendata is achieved by evaluating $$\lambda_l^{(j)} \in \mathbb{R} \text{ and } \psi_l^{(j)} \in \mathbb{R}^{|A_j|}$$

that satisfy the following equation for $l=1, \ldots, |A_j|$:

$$\sum_{m \in A_j} K(i, m)\psi_l^{(j)}(m) = \lambda_l^{(j)} \psi_l^{(j)}(i)$$

where $\lambda$ are the eigenvalues, $\psi$ are the eigenvectors, $K(i, m)$ is the Gram matrix, and $A_j$ are rows of the dataset without the missing values.

5. The method of claim 1 wherein the geometric harmonics are constructed according to the following equation:

$$\Psi_l^{(j)}(i) := \frac{1}{\lambda_l^{(j)}} \sum_{m \in A_j} K(i, m)\psi_l^{(j)}(m)$$

where $\psi$ are the eigenvectors, $\lambda$ are the eigenvalues, $K(i, m)$ is the Gram matrix, and $A_j$ are rows of the dataset without the missing values.

6. The method of claim 1 wherein the dataset comprises multiple image files or multiple frames from a video file.

7. The method of claim 1 wherein the performing is performed for four to six iterations.

8. A computing device comprising a processor, memory and a storage medium, the storage medium having software stored thereon which when executed by the processor cause the computing device to perform actions including:
  receiving a dataset having missing entries;
  initializing missing values in the dataset with random data;
  performing the following actions for multiple iterations:
    selecting a column to be updated and removing the selected column from the dataset,
    converting the dataset into a Gram matrix using a kernel function,
    extracting rows from the Gram matrix for which the selected column does not contain temporary values to form a reduced Gram matrix,
    diagonalizing the reduced Gram matrix to find eigendata including eigenvalues and eigenvectors,
    constructing geometric harmonics using the eigenvectors to fill in the missing values in the dataset, and
    filling in the missing values to improve the dataset and create a reconstructed dataset;
  providing the reconstructed dataset.

9. The computing device of claim 8 wherein the converting is performed using $K(i, j)=k(x_i, x_j)$ where $K(i, j)$ is the Gram matrix and $k(x_i, x_j)$ is the kernel function.

10. The computing device of claim 8 wherein the diagonalizing is achieved by computing the eigendata of $K^{(j)}*K^{(j)}$ where $K^{(j)}$ is a restricted Gram matrix.

11. The computing device of claim 10 wherein the computing the eigendata is achieved by evaluating
$\lambda_l^{(j)} \in \mathbb{R}$ and $\psi_l^{(j)} \in \mathbb{R}^{|A_j|}$
that satisfy the following equation for $l=1, \ldots, |A_j|$:

$$\sum_{m \in A_j} K(i, m)\psi_l^{(j)}(m) = \lambda_l^{(j)}\psi_l^{(j)}(i)$$

where $\lambda$ are the eigenvalues, $\psi$ are the eigenvectors, $K(i, m)$ is the Gram matrix, and $A_j$ are rows of the dataset without the missing values.

12. The computing device of claim 8 wherein the geometric harmonics are constructed according to the following equation:

$$\Psi_l^{(j)}(i) := \frac{1}{\lambda_l^{(j)}} \sum_{m \in A_j} K(i, m)\psi_l^{(j)}(m)$$

where $\psi$ are the eigenvectors, $\lambda$ are the eigenvalues, $K(i, m)$ is the Gram matrix, and $A_j$ are rows of the dataset without the missing values.

13. The computing device of claim 8 wherein the dataset comprises multiple image files or multiple frames from a video file.

14. The computing device of claim 8 wherein the performing is performed for four to six iterations.

* * * * *